United States Patent [19]

Nozawa et al.

[11] Patent Number: 6,031,050
[45] Date of Patent: Feb. 29, 2000

[54] RUBBER-MODIFIED STYRENIC RESIN COMPOSITION

[75] Inventors: Masayuki Nozawa, Ichihara; Masanari Fujita; Yasuji Shichijo, both of Kisarazu, all of Japan

[73] Assignee: Nippon Steel Chemical Co., Ltd, Tokyo, Japan

[21] Appl. No.: 08/894,848

[22] PCT Filed: Feb. 7, 1996

[86] PCT No.: PCT/JP96/00258

§ 371 Date: Aug. 22, 1997

§ 102(e) Date: Aug. 22, 1997

[87] PCT Pub. No.: WO96/24633

PCT Pub. Date: Aug. 15, 1996

[30] Foreign Application Priority Data

Feb. 8, 1995 [JP] Japan ................................ 7-020186

[51] Int. Cl.⁷ .................................................. C08L 51/04
[52] U.S. Cl. ............................................................ 525/242
[58] Field of Search .............................................. 525/242

[56] References Cited

U.S. PATENT DOCUMENTS 4,308,354 12/1981 Jung .......................................... 525/84

FOREIGN PATENT DOCUMENTS

| 59-221318 | 12/1984 | Japan . |
| 60-130613 | 7/1985 | Japan . |
| 60-130614 | 7/1985 | Japan . |
| 60-233116 | 11/1985 | Japan . |
| 60-233118 | 11/1985 | Japan . |
| 63-33461 | 2/1988 | Japan . |

*Primary Examiner*—Christopher Henderson
*Attorney, Agent, or Firm*—Darby & Darby

[57] ABSTRACT

A rubber-modified styrenic resin composition obtained by graft-polymerizing a styrenic monomer dissolving a rubber-like polymer, wherein (1) the rubber-like polymer is dispersed in a styrenic polymer matrix in the form of particles having a volume average particle diameter falling in the range of 0.5 to 1.6 μm, (2) the dispersed particles of said rubber-like polymer are of a salami structure in which a part of the styrenic polymer having a number average particle diameter falling in the range of 0.13 μm or more and up to 0.20 μm and a particle diameter distribution falling in the range of 1.15 to 1.35 is dispersed and included in the rubber-like polymer particles, and (3) the dispersed particles of said rubber-like polymer have a swelling ratio falling in the range of 7 to 12 in toluene.

The rubber-modified styrenic resin composition of the present invention is excellent in mechanical strength, a gloss and a coloring property and has a good balance between them.

1 Claim, No Drawings

RUBBER-MODIFIED STYRENIC RESIN COMPOSITION

TECHNICAL FIELD

The present invention relates to a rubber-modified styrenic resin composition having an excellent mechanical strength and gloss as well as an excellent coloring property.

BACKGROUND ART

Conventional rubber-modified styrenic resins (HIPS) have had the problems that they have a low impact resistance and are inferior in a surface gloss of the molded articles and in a hue obtained by toning with a dye or a pigment as compared with those of an ABS resin. Accordingly, a method has recently been proposed in which the particle diameter of rubber is decreased and the impact resistance is supplemented by silicon oil for the purpose of improving a balance between the impact resistance and the gloss, whereby it is brought close to the characteristic of an ABS resin. However, an HIPS composition obtained by such method has not necessarily been satisfactory in terms of a coloring property while a balance between the impact resistance and the gloss is improved.

In order to improve this defect, methods are proposed in Japanese Patent Publication No. Hei 3-62723 and Japanese Patent Publication No. Hei 1-34453, in which the particle diameter of an aromatic monovinyl polymer included in a dispersed rubber particle is made fine and uniform to thereby improve the coloring property and the mechanical properties. These methods are characterized by using specific polybutadiene and making the particle diameter of an aromatic monovinyl polymer included in a dispersed rubber particle fine to 0.13 micron or less and so uniform that 90% of the number thereof falls in the range of ±0.04 micron.

The coloring property is certainly improved by these methods. On the other hand, the mechanical strength, particularly tensile elongation and drop impact strength are notably reduced. A reduction in these mechanical strength has brought about the problem that the injection-molded article is liable to be broken when it is released from a mold or dropped, and therefore the improvement has been desired.

DISCLOSURE OF THE INVENTION

An object of the present invention is to overcome such a defect and to provide a rubber-modified styrenic resin composition having an excellent coloring property without deteriorating a balance between the gloss and the mechanical strength.

The present inventors have found that HIPS capable of being suited to the object described above can be obtained by controlling the number average particle diameter and the particle diameter distribution of a styrenic polymer included in rubber particles of the HIPS to the specific ranges and thus have come to complete the present invention based on this knowledge.

That is, the present invention relates to a rubber-modified styrenic resin composition comprising 80 to 96% by weight of a styrenic polymer and 20 to 4% by weight of the rubber-like polymer which is obtained by graft-polymerizing a styrenic monomer dissolving a rubber-like polymer, wherein:

(1) the rubber-like polymer is dispersed in a styrenic polymer matrix in the form of particles having a volume average particle diameter falling in the range of 0.5 to 1.6 $\mu$m, (2) the dispersed particles of the above rubber-like polymer are of a salami structure in which a part of the styrenic polymer having a number average particle diameter falling in the range of 0.13 $\mu$m or more and up to 0.20 $\mu$m and a particle diameter distribution falling in the range of 1.15 to 1.35 is dispersed and included in the rubber-like polymer particles, and (3) the dispersed particles of the rubber-like polymer have a swelling ratio falling in the range of 7 to 12 in toluene.

The present invention shall be explained below in detail.

The styrenic monomer constituting the rubber-modified styrenic resin composition of the present invention includes, as well as the styrenic monomer alone, other vinyl monomers copolymerizable with the styrenic monomer which are used in combination therewith. The styrenic monomer includes aromatic monovinyl compounds such as styrene, α-methylstyrene, o-methylstyrene, m-methylstyrene, p-methylstyrene, vinylethylbenzene, vinylxylene and vinylnaphthalene. The vinyl monomers copolymerizable with the styrenic monomer include, for example, methyl methacrylate, ethyl methacrylate, methyl acrylate, ethyl acrylate, acrylonitrile, methacrylonitrile, methacrylic acid, acrylic acid, maleic anhydride, phenylmaleimide, and halogen-containing vinyl monomers. These monomers may be used alone or in combination of two or more kinds thereof and can be used in a proportion of usually 30% by weight or less, preferably 10% by weight or less based on the whole styrenic monomers including styrene.

In the rubber-modified styrenic resin composition of the present invention, the graft-polymerized rubber-like polymer accounts for 4 to 20% by weight relative to 96 to 80% by weight of the styrenic polymer matrix. The rubber-like polymer of less than 4% by weight makes the impact resistance insufficient, and the rubber-like polymer exceeding 20% by weight reduces the rigidity to below a practical range. Accordingly, both proportions are not preferred.

In the rubber-modified styrenic resin composition of the present invention, the rubber-like polymer which is graft-polymerized and dispersed in the styrenic polymer matrix has to have a volume average particle diameter of 0.5 to 1.6 $\mu$m, preferably 0.8 to 1.3 $\mu$m. The average particle diameter of less than 0.5 $\mu$m makes the impact resistance insufficient, and the average particle diameter exceeding 1.6 $\mu$m reduces markedly the gloss.

Further, In order to achieve the object of the present invention, the styrenic polymer dispersed and included in the dispersed rubber-like polymer particles has to have a number average particle diameter of 0.13 $\mu$m or more and up to 0.20 $\mu$m, preferably 0.14 to 0.19 $\mu$m and more preferably 0.15 to 0.18 $\mu$m. If the dispersed and included styrenic polymer has a number average particle diameter of 0.13 $\mu$m or less, the mechanical strength tends to drastically drop, and the number average particle diameter exceeding 0.20 $\mu$m lowers notably the coloring property. In order to obtain the intended resin composition with a physical property balance between the coloring property and the mechanical strength, it is important to control the particle diameter distribution of the styrenic polymer dispersed and included in the dispersed rubber-like polymer particles to a range of 1.15 to 1.35, preferably 1.20 to 1.30. The particle diameter distribution of 1.15 or less reduces the mechanical strength, particularly the drop impact strength, and the particle diameter distribution of 1.35 or more lowers the coloring property. Accordingly, both ranges are not preferred. It is effective for improving the coloring property to make the particle diameter of the dispersed and included styrenic polymer fine and uniform, but making the particle diameter finer and more uniform than necessary brings about a reduction in the mechanical strength, particularly the tensile elongation and the drop impact strength and makes it difficult to maintain the physical property balance. Accordingly, the object of the present invention can not be achieved.

Further, in order to achieve the object of the present invention, the dispersed rubber-like polymer particles have to have a swelling ratio in toluene falling in a range of 7 to 12, preferably 8 to 11. In the present invention, the swelling ratio smaller than 7 lowers markedly the impact resistance, and the swelling ratio larger than 12 is liable to cause irregular color and uneven gloss on the molded article and deteriorates the appearance. Accordingly, both ranges are not preferred. The 5% by weight solution of the rubber-like polymer used in the present invention in styrene has preferably a solution viscosity (SV value) of 10 to 100 cps, more preferably 20 to 90 cps at 25° C. The solution viscosity (SV value) of 10 cps or lower tends to decrease the rubber particle diameter too much and reduces the mechanical strength. Accordingly, it is not preferred. On the other hand, the solution viscosity of 100 cps or more tends to increase the rubber particle diameter too much and reduces the gloss. Accordingly, it is not preferred as well.

The rubber-like polymer used shall not specifically be restricted as long as such conditions are satisfied, and there can be used polybutadiene, a styrene-butadiene copolymer, polyisoprene, a butadiene-styrene-isoprene copolymer and natural rubber. A micro structure at the polybutadiene portion may be low cis-polybutadiene rubber or high cis-polybutadiene rubber or may be a mixture of low cis-polybutadiene rubber and high cis-polybutadiene rubber. The styrene-butadiene copolymer may have a structure of a random type, a block type or a taper type. These rubber-like polymers can be used alone or in combination of two or more kinds thereof.

In the present invention, particularly when a styrene-butadiene copolymer is used as the rubber-like polymer, a balance between the coloring property and the gloss is more improved, and therefore the styrene-butadiene copolymer is used as the rubber-like polymer preferably in a content of 50% by weight or more, more preferably 75% by weight or more. However, when the styrene-butadiene copolymer having a large content of styrene is used, the impact resistance at low temperatures tends to be lowered, and therefore styrene contained in the styrene-butadiene copolymer has preferably a content of 1 to 20% by weight, more preferably 1 to 10% by weight.

The rubber-modified styrenic resin composition of the present invention can be blended, if necessary, with various additives such as internal lubricants, plasticizers, antioxidants, UV absorbers, anti-static agents, mold releasing agents, flame retardants, dyes and pigments, and silicon oils. These additives can be added at optional steps. They may be added, for example, at a molding step of a molded article or a polymerization step of the product.

The rubber-modified styrenic resin composition of the present invention is obtained by dissolving the rubber-like polymer in the styrenic monomer and graft-polymerizing them by block polymerization or solution polymerization. Particularly preferred in the present invention is a polymerization method in which the rubber-like polymer is mixed and dissolved in advance in the styrenic monomer together with a specific amount of polystyrene to prepare a raw material solution, and the solution is graft-polymerized by block polymerization or solution polymerization. In this case, the raw material solution is preferably pre-heated in advance to 70 to 120° C. and then continuously charged into a plug flow type reactor of a column type or a static mixer type to carry out block polymerization or solution polymerization. The more the polystyrene content in the raw material mixed solution in the graft polymerization is, the smaller the particle diameter of the styrenic polymer dispersed and included in the dispersed particles of the rubber-like polymer produced tends to be. Accordingly, the particle diameter of the styrenic polymer dispersed and included in the dispersed particles of the rubber-like polymer can be controlled by regulating the amount of polystyrene and the rubber-like polymer blended into the mixed solution.

In this case, it is preferred that the amount of polystyrene blended into the mixed solution of the raw materials falls in a range of 2 to 30% by weight and the content R (% by weight) of the rubber-like polymer and the content P (% by weight) of polystyrene satisfy a relation of $0.2<P/R<3$ and that after regulating the mixed solution to the state in which rubber phase reversion is not occurred at a pre-heating step, the mixed solution is fed into the plug flow type reactor, and graft polymerization is carried out while causing rubber phase reversion under a stirring condition causing no back mixing. Such regulation readily makes it possible to control the dispersed particle diameter of the rubber-like polymer and the particle diameter of the styrenic polymer dispersed and included in the dispersed rubber particles, which are prescribed in the present invention.

In this case, in order to adjust the viscosity of the system in dissolving polystyrene, a solvent can be added if necessary. An organic solvent selected from aromatic hydrocarbons such as toluene, xylene and ethylbezene, and ketones such as methyl ethyl ketone is blended as the solvent in a proportion of 30 parts by weight or less, preferably 10 to 20 parts by weight per 100 parts by weight of the raw material mixed solution.

In addition, organic peroxides as a polymerization initiator, chain transfer agents, antioxidants and mineral oils can suitably be added if necessary.

The polymerization reaction is continued until the polymerization conversion rate of the styrenic monomer contained in the raw material solution comes up to 60 to 98% by weight, and volatilization treatment is carried out by means of a volatilizing apparatus under reduced pressure while suitably carrying out heat treatment to remove the unreacted monomer and the solvent, whereby the desired rubber-modified styrenic resin composition can be obtained. The swelling ratio can be controlled by selecting the conditions such as a heat treatment temperature and time before or after removing the unpolymerized monomer usually after finishing the polymerization.

BEST MODE FOR CARRYING OUT THE INVENTION

The present invention shall be explained below in further detail with reference to examples but the present invention shall by no means be restricted by these examples.

The physical properties of the resins were determined by the methods shown below:

(1) Measurement of Particle Diameter and Particle Diameter Distribution of Dispersed Rubber In a coulter counter (coulter multisizer, type II) fitted with an aperture tube having a diameter of 30 $\mu$m, 2 to 3 pieces of the resin pellets are put into a mixed solvent of methyl ethyl ketone/acetone to dissolve only a polystyrene portion forming a matrix, and then the solution is separated with a centrifugel separator from a rubber particle portion, which is not dissolved. Then, the separated rubber particles are dispersed in a dimethylformamide electrolytic solution at a suitable concentration to determine the particle diameter and the particle diameter distribution of the dispersed rubber.

(2) Measurement of Particle Diameter and Particle Diameter Distribution of Included Styrenic Polymer The resin is dyed with osmium tetraoxide, and an electron microscopic photograph thereof is taken by a ultrathin sectioning method. Particles having a diameter of 0.05 μm or more out of the aromatic vinyl polymer particles included in the dispersed rubber particles in the photograph enlarged to 10,000 magnification are measured for the areas of the particles to calculate the circle-equivalent diameters. The 500 to 1000 particles are observed to determine a number average particle diameter and a weight average particle diameter. The particle diameter distribution is obtained in terms of number average particle diameter/weight average particle diameter.

(3) IZ Impact Strength

Measured according to JIS K6871 (provided with a notch).

(4) Rubber Content (Rc)

Determined by a Wijs method.

(5) Swelling Ratio

The resin 1 g is dissolved in 30 ml of toluene, and insoluble matters (rubber particles) are precipitated with a centrifugal separator. The supernatant is thrown away, and precipitated swollen gel is weighed. Further, this gel is dried to a constant weight, and the dried gel is weighed to determine the swelling ratio from the following equation:

swelling ratio=(swollen gel weight wt %–dried gel weight wt %)/dried gel weight wt %

(6) Bending Elastic Modulus

Determined according to ASTM D-790.

(7) Tensile Elongation

Determined according to JIS K7113 (measuring speed: 500 mm/min).

(8) Drop Impact Strength

Determined according to JIS K7211.

(9) Gloss

Determined according to ASTM D-523 at an incident angle of 60°.

(10) Coloring Property

Carbon black of 0.05 part by weight is added to 100 parts by weight of the resin to form a molded article (length: 75 mm, width: 50 mm, thickness: 4 mm). Similarly, each 0.05 part by weight of a red dye or pigment and a blue dye or pigment is added to form molded articles. Molded articles obtained by adding carbon black, the red dye or pigment and the blue dye or pigment respectively to polystyrene are used as standard samples, and respective resins are evaluated for hue (susceptibility to dyeing of the resins as compared with the original colors of the pigments) in toning with the dyes or pigments. The evaluation is made according to 10 grades, wherein 10 is given to the most excellent coloring property.

EXAMPLE 1

The following mixture (a) was continuously fed as a raw material solution into a complete mixing vessel type pre-heater having a content volume of 25 liter at a feed rate of 30 liter/hr.

| Mixture (a): | |
|---|---|
| Styrene: | 79% by weight |
| Styrene-butadiene rubber (SBR): | 6% by weight |
| (SV value: 20 cps, styrene content: 2.5% by weight) | |
| Polystyrene (GP): | 15% by weight |
| Total | 100 parts by weight |
| Ethylbenzene (EB): | 10 parts by weight |
| 1,1-Di-tert-butylperoxy-cyclohexane (PO): | 0.02 part by weight |
| Mineral oil (PDS): | 2 parts by weight |

After pre-heating the mixture up to 80° C. in the pre-heater, the whole amount thereof was continuously charged into the first reactor, which is a column type plug flow reactor equipped with a stirrer and has a content volume of 45 liter, to carry out polymerization. Polymerization temperatures in the first reactor was so controlled as to produce such a temperature gradient that the temperatures became higher along the flow direction in a range of 100 to 115° C. The rubber-like polymer remained at the outlet of the pre-heater in such state that the polymer had not yet been phase-reversed. The polymerization which was continued in the first reactor while stirring resulted in bringing about the state that the polymerization liquid finished phase reversion at the outlet of the first reactor.

Subsequently, the whole amount of the polymerization liquid described above was continuously charged into the second reactor comprising three static mixer type plug flow reactors each having a content volume of 50 liter, which were disposed in series, to continue the polymerization, and the polymerization was caused to progress until the polymerization conversion rate of styrene came up to 88%. Volatile components were removed from this polymerization liquid in a two-shaft extruder equipped with 3 vents under reduced pressure while subjecting it to heat treatment at 230° C., and then the resin was pelletized.

The physical properties of the resin thus obtained are shown in Table 1.

EXAMPLE 2

An experiment was carried out under the same conditions as in Example 1 described above, except that the following mixture (b) was used as the raw material solution. The physical properties of the resin thus obtained are shown in Table 1.

| Mixture (b): | |
|---|---|
| Styrene: | 79% by weight |
| Butadiene rubber (PB; SV value: 20 cps): | 6% by weight |
| Polystyrene (GP): | 15% by weight |
| Total | 100 parts by weight |
| Ethylbenzene (EB): | 10 parts by weight |
| 1,1-Di-tert-butylperoxy-cyclohexane (PO): | 0.02 part by weight |
| Mineral oil (PDS): | 2 parts by weight |

EXAMPLE 3

An experiment was carried out under the same conditions as in Example 1 described above, except that the following mixture (c) was used as the raw material solution. The physical properties of the resin thus obtained are shown in Table 1.

Mixture (c):

| | |
|---|---|
| Styrene: | 86% by weight |
| Styrene-butadiene copolymer: (SBR; SV value: 75 cps, styrene content: 7.5% by weight) | 2% by weight |
| Butadiene rubber (PB; SV value: 85 cps): | 2% by weight |
| Polystyrene (GP): | 10% by weight |
| Total | 100 parts by weight |
| Ethylbenzene (EB): | 10 parts by weight |
| 1,1-Di-tert-butylperoxy-cyclohexane (PO): | 0.02 part by weight |
| Mineral oil (PDS): | 2 parts by weight |

EXAMPLE 4

An experiment was carried out under the same conditions as in Example 1 described above, except that the following mixture (d) was used as the raw material solution. The physical properties of the resin thus obtained are shown in Table 1.

Mixture (d):

| | |
|---|---|
| Styrene | 86% by weight |
| Butadiene rubber (PB; SV value: 85 cps): | 4% by weight |
| Polystyrene (GP): | 10% by weight |
| Total | 100 parts by weight |
| Ethylbenzene (EB): | 10 parts by weight |
| 1,1-Di-tert-butylperoxy-cyclohexane (PO): | 0.02 part by weight |
| Mineral oil (PDS): | 2 parts by weight |

COMPARATIVE EXAMPLE 1

An experiment was carried out under the same conditions as in Example 1 described above, except that the following mixture (e) was used as the raw material solution. The physical properties of the resin thus obtained are shown in Table 1.

Mixture (e):

| | |
|---|---|
| Styrene: | 74% by weight |
| Styrene-butadiene rubber: (SBR; SV value: 20 cps, styrene content: 2.5% by weight) | 6% by weight |
| Polystyrene (GP): | 20% by weight |
| Total | 100 parts by weight |
| Ethylbenzene (EB): | 10 parts by weight |
| 1,1-Di-tert-butylperoxy-cyclohexane (PO): | 0.02 part by weight |
| Mineral oil (PDS): | 2 parts by weight |

In this Comparative Example 1, the particle diameters of polystyrene included in the rubber particles become excessively fine and uniform, and while the coloring property is good, the mechanical strength, particularly the tensile elongation and the drop impact strength are notably reduced.

COMPARATIVE EXAMPLE 2

An experiment was carried out under the same conditions as in Example 1 described above, except that the following mixture (f) was used as the raw material solution. The physical properties of the resin thus obtained are shown in Table 1.

Mixture (f):

| | |
|---|---|
| Styrene: | 82% by weight |
| Butadiene rubber (PB; SV value: 170 cps): | 6% by weight |
| Polystyrene (GP): | 12% by weight |
| Total | 100 parts by weight |
| Ethylbenzene (EB): | 10 parts by weight |
| 1,1-Di-tert-butylperoxy-cyclohexane (PO): | 0.02 part by weight |
| Mineral oil (PDS): | 2 parts by weight |

In this Comparative Example 2, the solution viscosity of the rubber-like polymer is increased, and the particle diameters of the dispersed rubber become large. Accordingly, the gloss is inferior.

COMPARATIVE EXAMPLE 3

An experiment was carried out under the same conditions as in Example 1 described above, except that the following mixture (g) was used as the raw material solution. The physical properties of the resin thus obtained are shown in Table 1.

Mixture (g):

| | |
|---|---|
| Styrene: | 94% by weight |
| Butadiene rubber (PB; SV value: 85 cps): | 6% by weight |
| Total | 100 parts by weight |
| Ethylbenzene (EB): | 10 parts by weight |
| 1,1-Di-tert-butylperoxy-cyclohexane (PO): | 0.02 part by weight |
| Mineral oil (PDS): | 2 parts by weight |

In this Comparative Example 3, the particle diameters of polystyrene included in the rubber particles are large and uneven, and the coloring property is markedly inferior.

COMPARATIVE EXAMPLE 4

An experiment was carried out under the same conditions as in Example 1 described above, except that the following mixture (h) was used as the raw material solution, and the temperature of the two-shaft extruder was changed to 210° C. The physical properties of the resin thus obtained are shown in Table 1.

Mixture (h):

| | |
|---|---|
| Styrene: | 94% by weight |
| Butadiene rubber (PB; SV value: 170 cps): | 6% by weight |
| Total | 100 parts by weight |
| Ethylbenzene (EB): | 10 parts by weight |

-continued

Mixture (h):

| | |
|---|---|
| 1,1-Di-tert-butylperoxy-cyclohexane (PO): | 0.02 part by weight |
| Mineral oil (PDS): | 2 parts by weight |

In this Comparative Example 4, the particle diameters of polystyrene included in the rubber particles are large and uneven, and the swelling ratio is high. Accordingly, the coloring property is markedly inferior.

TABLE 1

| | Example | | | | Comparative Example | | | |
|---|---|---|---|---|---|---|---|---|
| | 1 | 2 | 3 | 4 | 1 | 2 | 3 | 4 |
| Rubber | | | | | | | | |
| Kind of rubber | 2.5% SBR | PB | 7.5% SBR/PB | PB | 2.5% SBR | PB | PB | PB |
| SV (cps) | 20 | 20 | 75/85 | 85 | 20 | 170 | 85 | 170 |
| Raw materials | | | | | | | | |
| Rubber (R) (wt %) | 6 | 6 | 4 (2 + 2) | 4 | 6 | 6 | 6 | 6 |
| Styrene (wt %) | 79 | 79 | 86 | 86 | 74 | 82 | 94 | 94 |
| GP (wt %) | 15 | 15 | 10 | 10 | 20 | 12 | 0 | 0 |
| GP/R | 2.5 | 2.5 | 2.5 | 2.5 | 3.3 | 2 | 0 | 0 |
| Solvent (wt part) | 10 | 10 | 10 | 10 | 10 | 10 | 10 | 10 |
| PO (wt part) | 0.02 | 0.02 | 0.02 | 0.02 | 0.02 | 0.02 | 0.02 | 0.02 |
| PDS (wt part) | 2 | 2 | 2 | 2 | 2 | 2 | 2 | 2 |
| Temperature of pre-heater (° C.) | 80 | 80 | 80 | 80 | 80 | 80 | 80 | 80 |
| Temperature of two-shaft extruder (° C.) | 230 | 230 | 230 | 230 | 230 | 230 | 230 | 210 |
| Product | | | | | | | | |
| Rubber content (wt %) | 7 | 7 | 5 | 4.9 | 7.2 | 6.8 | 6.9 | 5.1 |
| Average rubber particle diameter (μm) | 1 | 1.1 | 1.3 | 1.4 | 1.2 | 2.5 | 1.2 | 1.4 |
| Rubber particle diameter distribution | 1.3 | 1.4 | 1.4 | 1.5 | 1.3 | 1.6 | 1.5 | 1.6 |
| Included particle diameter (μm) | 0.17 | 0.18 | 0.16 | 0.15 | 0.1 | 0.19 | 0.25 | 0.24 |
| Included particle diameter distribution | 1.22 | 1.24 | 1.21 | 1.2 | 1.14 | 1.3 | 1.39 | 1.37 |
| Physical properties | | | | | | | | |
| Swelling ratio | 10.2 | 9.8 | 10.3 | 10.5 | 10.7 | 10.3 | 10.1 | 13.1 |
| Tensile elongation (%) | 15 | 20 | 12 | 10 | 4 | 12 | 18 | 13 |
| Drop impact strength (kg · cm) | 150 | 180 | 40 | 45 | 15 | 130 | 160 | 50 |
| IZOD impact strength (kg · cm/cm) | 9 | 9.3 | 6 | 6.5 | 5.2 | 8.8 | 9.1 | 7.3 |
| Bending elastic modulus (kg/cm²) | 225 | 220 | 255 | 255 | 230 | 210 | 205 | 235 |
| Gloss (mm) | 94 | 92 | 98 | 97 | 89 | 40 | 87 | 89 |
| Coloring property | 10 | 9 | 10 | 9 | 9 | 5 | 2 | 3 |

INDUSTRIAL APPLICABILITY

The rubber-modified styrenic resin composition obtained according to the present invention not only has good mechanical strength but also is excellent in gloss and a coloring property and has a good balance between them. This makes the resin composition according to the present invention suitable to products used for front panels and housings used in the electric and electronic fields in which particularly good appearance characteristics are required.

We claim:

1. A rubber-modified styrenic resin composition comprising 80 to 96% by weight of a styrenic polymer and 20 to 4% by weight of a rubber, said composition obtained by graft-polymerizing a styrenic monomer dissolving the rubber, wherein (1) the rubber is selected from the group consisting of polybutadiene, styrene-butadiene copolymers, polyisoprene, butadiene-styrene-isoprene copolymers, natural rubber, and mixtures thereof, and is dispersed in a styrenic polymer in the form of particles having a volume average particle diameter falling in the range of 0.5 to 1.6 μm, (2) the dispersed particles of the rubber have a swelling ratio falling in the range of 7 to 12 in toluene, wherein the dispersed particles of the rubber are of a salami structure in which a part of the styrenic polymer having a number average particle diameter within the range of $\geq 0.15$ μm to $\leq 0.20$ μm and a particle diameter distribution falling in the range of 1.15 to 1.35 is dispersed and included in the rubber particles.

* * * * *